(12) United States Patent
Oohashi et al.

(10) Patent No.: US 6,936,941 B2
(45) Date of Patent: Aug. 30, 2005

(54) ROTARY ELECTRIC MACHINE

(75) Inventors: Atsushi Oohashi, Tokyo (JP); Toshiaki Kashihara, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/800,751

(22) Filed: Mar. 16, 2004

(65) Prior Publication Data

US 2004/0256927 A1 Dec. 23, 2004

(30) Foreign Application Priority Data

Jun. 19, 2003 (JP) ........................................ 2003-175154

(51) Int. Cl.[7] ................................................. H02K 7/00
(52) U.S. Cl. ..................................... 310/68 D; 310/71
(58) Field of Search ................................ 310/68 D, 64, 310/71

(56) References Cited

U.S. PATENT DOCUMENTS

| | | | | |
|---|---|---|---|---|
| 3,731,126 A | * | 5/1973 | Hagenlocher et al. | .... 310/68 R |
| 4,843,267 A | * | 6/1989 | Kaneyuki | .................. 310/68 D |
| 5,949,166 A | * | 9/1999 | Ooiwa et al. | .............. 310/68 D |
| 6,150,741 A | * | 11/2000 | Hayashi et al. | ........... 310/68 D |
| 6,528,912 B2 | * | 3/2003 | Asao | ......................... 310/68 D |

FOREIGN PATENT DOCUMENTS

| | | |
|---|---|---|
| JP | 05-219703 A | 8/1993 |
| JP | 09-107654 A | 4/1997 |

* cited by examiner

Primary Examiner—Dang Le
(74) Attorney, Agent, or Firm—Sughrue Mion, PLLC

(57) ABSTRACT

A relay terminal bolt is mounted to a positive-side heat sink such that a head portion thereof is in a state of close surface contact with a first surface of the positive-side heat sink and an external screw thread portion projects outward from a second surface of the positive-side heat sink. An output terminal is secured by placing a mounting portion in a state of surface contact with a flange portion and fastening it with a nut screwed onto the external screw thread portion. In addition, a wiring harness terminal is securely fastened to a coupling seat in a state of surface contact with a nut screwed onto the external screw thread portion.

6 Claims, 5 Drawing Sheets

ROTARY ELECTRIC MACHINE

BACKGROUND OF THE INVENTION

1. Field of the Invention

The present invention relates to a rotary electric machine such as an alternator, etc., and particularly to an output terminal construction used to direct output power from the rotary electric machine to external equipment.

2. Description of the Related Art

In conventional automotive alternators, an external screw thread portion is disposed at an opposite end of an output terminal bolt from an extraction end, the external screw thread portion of the output terminal bolt being securely fastened to a one-sided tightening nut secured by crimping to a penetrating aperture disposed on a positive-side cooling fin of a rectifier apparatus. At the extraction end of the output terminal bolt, a wiring harness terminal is securely fastened with a nut by means of an electrically-insulating bush made of a resin, a rear-end end frame, and another electrically-insulating bush made of a resin. (See Patent Literature 1, for example.)

Patent Literature 1: Japanese Patent Laid-Open No. HEI 9-107654 (Gazette, Paragraph [0009] and FIG. 2)

In conventional automotive alternators, a terminal that is electrically connected to an automotive vehicle wiring harness is inserted into the output terminal bolt and securely fastened with a nut to output electric power to automotive vehicle equipment. Now, in an electrical conduction pathway leading from the positive-side cooling fin to the output terminal bolt, a coupling portion between the external screw thread portion at an opposite end of the output terminal bolt from an output extraction end and the one-sided tightening nut interposes, and in an electrical conduction pathway leading from the output terminal bolt to the wiring harness terminal, a coupling portion between the external screw thread portion at the output extraction end of the output terminal bolt and the nut interposes. Electrical resistance at these coupling portions is large, increasing the heat generated at the coupling portions during the extraction of high-output electric current.

Thus, heat generated at the coupling portion at the opposite end of the output terminal bolt from the output extraction end gives rise to temperature increases in diodes constituting a rectifier apparatus that are disposed in close proximity to the output terminal bolt. Heat generated at the coupling portions at the output extraction end of the output terminal bolt also gives rise to heat degradation and thermal contraction of electrically-insulating bushes made of a resin, loosening the coupling by the nut, thereby giving rise to reductions in the force fastening the wiring harness terminal to the output terminal bolt.

SUMMARY OF THE INVENTION

The present invention aims to solve the above problems and an object of the present invention is to provide a rotary electric machine enabling temperature increases in diodes to be prevented and also enabling the occurrence of insufficient force for fastening a wiring harness terminal to an output terminal to be prevented by eliminating coupling portions with screw threads in a main electrical conduction pathway from a rectifier apparatus to the wiring harness terminal to suppress heat generation at the output terminal.

In order to achieve the above object, according to one aspect of the present invention, there is provided a rotary electric machine including a rectifier apparatus having positive-side and negative-side heat sinks each mounted with a plurality of diode elements and a circuit board made of a resin in which insert conductors for connecting the diode elements are insert molded, the rectifier apparatus being mounted to a housing by electrically-connecting the negative-side heat sink to the housing and securely fastening the positive-side and negative-side heat sinks and the circuit board to a mounting surface of the housing; an output terminal for extracting output from the rectifier apparatus; and a wiring harness terminal mounted to the output terminal. The rotary electric machine is provided with a mounting member having a head portion disposed at an opposite end from an output extraction end and an output terminal mounting external screw thread portion disposed at the output extraction end. The mounting member is mounted to the positive-side heat sink such that the head portion is in a state of close surface contact with a first surface of the positive-side heat sink, the mounting member passes through the positive-side heat sink, and the output terminal mounting external screw thread portion projects outward from a second surface of the positive-side heat sink. The output terminal has a coupling seat, a wiring harness terminal mounting external screw thread portion disposed at an output extraction end of the coupling seat and a mounting portion disposed on at an opposite end from the output extraction end of the coupling seat. The output terminal is mounted to the positive-side heat sink by securely fastening the mounting portion to the second surface of the positive-side heat sink in a state of surface contact by means of an output terminal mounting nut screwed onto the output terminal mounting external screw thread portion such that the coupling seat and the wiring harness terminal mounting external screw thread portion project outward from the housing. The wiring harness terminal is securely fastened to the coupling seat in a state of surface contact by means of a wiring harness terminal mounting nut screwed onto the wiring harness terminal mounting external screw thread portion.

Therefore, a rotary electric machine enabling temperature increases in the diodes to be prevented and also enabling the occurrence of insufficient force for fastening the wiring harness terminal to the output terminal to be prevented is provided.

According to another aspect of the present invention, there is provided a rotary electric machine including a rectifier apparatus having positive-side and negative-side heat sinks each mounted with a plurality of diode elements and a circuit board made of a resin in which insert conductors for connecting the diode elements are insert molded, the rectifier apparatus being mounted to a housing by electrically-connecting the negative-side heat sink to the housing and securely fastening the positive-side and negative-side heat sinks and the circuit board to a mounting surface of the housing; an output terminal for extracting output from the rectifier apparatus; and a wiring harness terminal mounted to the output terminal. The output terminal has a head portion disposed at an opposite end from an output extraction end of the output terminal and an external screw thread portion disposed at the output extraction end of the output terminal. The output terminal is mounted to the positive-side heat sink such that the head portion is in a state of close surface contact with a first surface of the positive-side heat sink, the output terminal passes through the positive-side heat sink, and the external screw thread portion projects outward from the housing. A tubular relay member is mounted to the output terminal such that a first end of the relay member is in a state of close surface contact with a second surface of the positive-side heat sink. The wiring harness terminal is securely fastened to the positive-side heat sink through the relay member by means of a nut screwed onto the external screw thread portion so as to be in a state of close surface contact with a second end of the relay member.

Therefore, a rotary electric machine enabling temperature increases in the diodes to be prevented and also enabling the occurrence of insufficient force for fastening the wiring harness terminal to the output terminal to be prevented is provided.

DETAILED DESCRIPTION OF THE PREFERRED EMBODIMENTS

Preferred embodiments of the present invention will now be explained with reference to the drawings.
Embodiment 1

Figure 1:
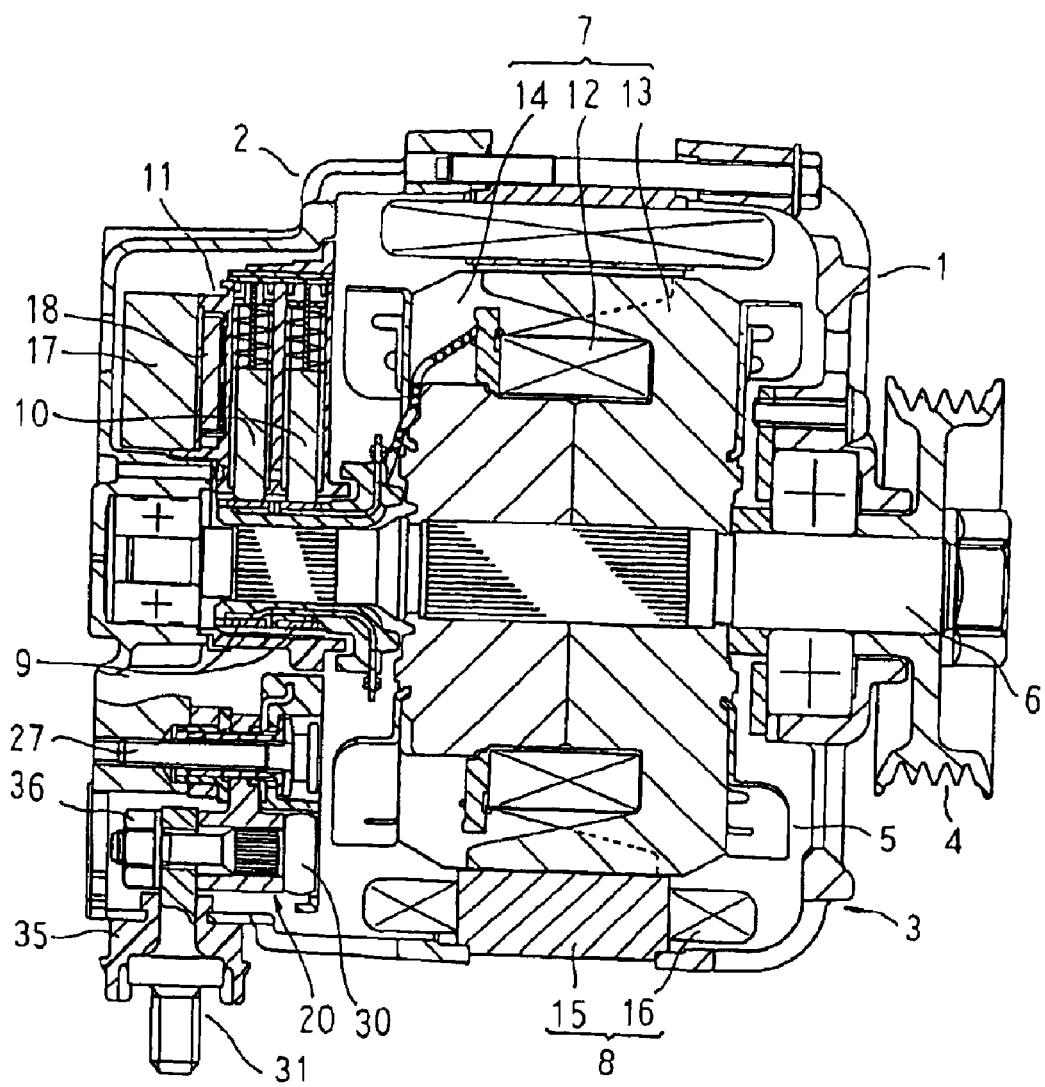
FIG. 1 is a longitudinal section showing an automotive alternator according to Embodiment 1 of the present invention.
Figure 2:
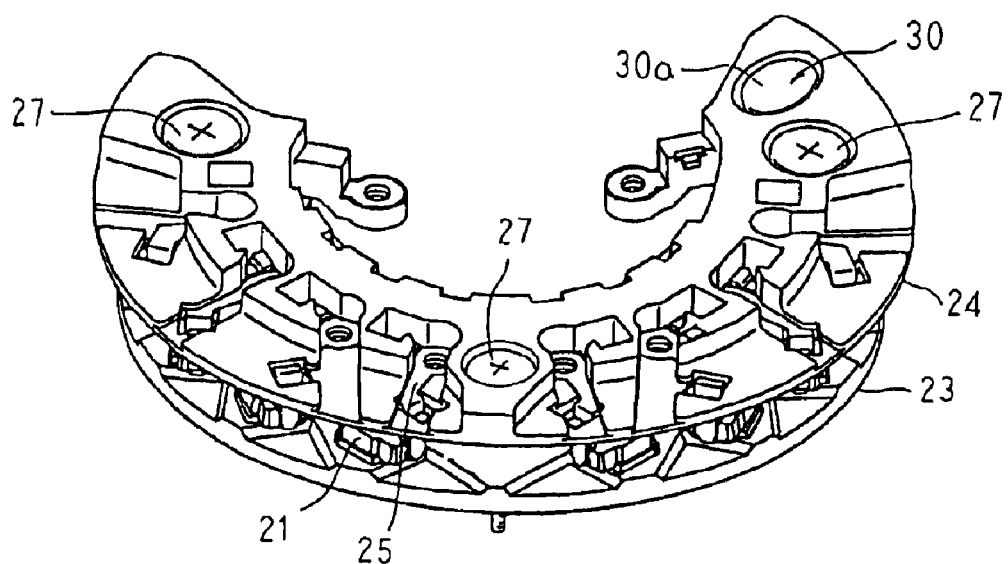
FIG. 2 is a perspective showing a rectifier apparatus used in the automotive alternator according to Embodiment 1 of the present invention.
Figure 3:
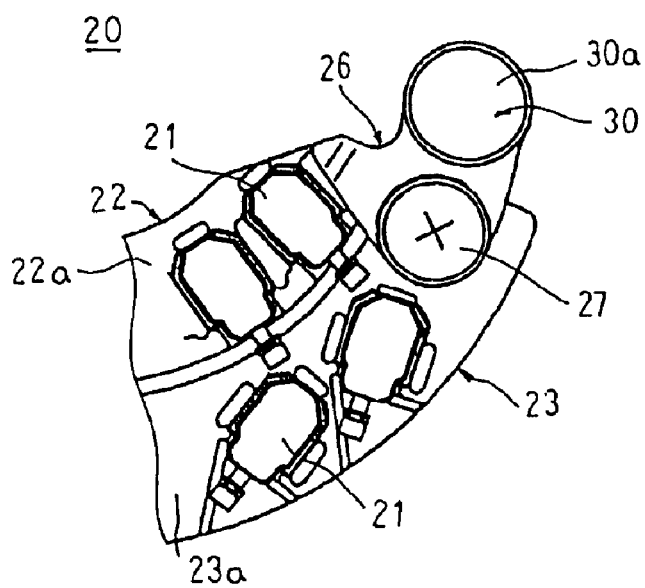
FIG. 3 is a plan showing part of the rectifier apparatus shown in FIG. 2 with a circuit board removed.
Figure 4:
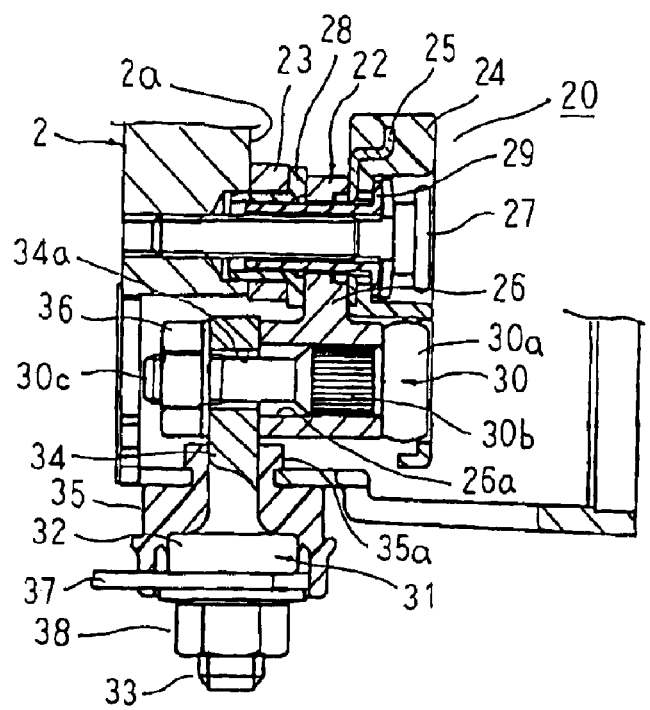
FIG. 4 is a partial cross section showing a wiring harness terminal mounted to an output terminal of the automotive alternator according to Embodiment 1 of the present invention.

FIG. 1 is a longitudinal section showing an automotive alternator according to Embodiment 1 of the present invention, FIG. 2 is a perspective showing a rectifier apparatus used in the automotive alternator according to Embodiment 1 of the present invention, FIG. 3 is a plan showing part of the rectifier apparatus shown in FIG. 2 with a circuit board removed, and FIG. 4 is a partial cross section showing a wiring harness terminal mounted to an output terminal of the automotive alternator according to Embodiment 1 of the present invention.

In FIG. 1, an automotive alternator is provided with: a housing 3 constituted by a front bracket 1 and a rear bracket 2 made of aluminum; a shaft 6 disposed inside the housing 3, a pulley 4 secured to a first end portion of the shaft 6; a Lundell-type rotor 7 secured to the shaft 6; fans 5 secured to first and second axial end portions of the rotor 7; a stator 8 secured to the housing 3 so as to envelop the rotor 7; slip rings 9 secured to a second end portion of the shaft 6 for supplying an electric current to the rotor 7; a pair of brushes 10 sliding on surfaces of the slip rings 9; a brush holder 11 for housing the brushes 10; a rectifier apparatus 20 electrically connected to the stator 8 for converting an alternating current generated in the stator 8 into a direct current; and a regulator 18 mounted to a heat sink 17 fitted onto the brush holder 11, the regulator 18 adjusting the magnitude of an alternating voltage generated in the stator 8.

The rotor 7 includes: a field winding 12 for generating a magnetic flux on passage of an electric current; and a pair of first and second pole cores 13 and 14 disposed so as to cover the field winding 12, magnetic poles being formed in the first and second pole cores 13 and 14 by the magnetic flux from the field winding 12. The stator 8 is constituted by: a cylindrical stator core 15; and a stator winding 16 installed in the stator core 15.

The rectifier apparatus 20, as shown in FIGS. 2 and 3, is constituted by: a plurality of the diode elements 21 for full-wave rectification of a three-phase current; a positive-side heat sink 22 for supporting and cooling the diode elements 21; a negative-side heat sink 23 for supporting and cooling the diode elements 21; and a circuit board 24. Insert conductors 25 are insert-molded into the circuit board 24, the diode elements 21 being connected to the insert conductors 25 to constitute a three-phase full-wave rectifying circuit. Moreover, a good heat-conducting material such as aluminum is used in the positive-side and negative-side heat sinks 22 and 23, and a resin such as a polyphenylene sulfide, etc., is used in the circuit board 24.

The positive-side heat sink 22 is formed into a flat arc shape having flange portions 26 at first and second ends and a central portion in a circumferential direction, a plurality of the diode elements 21 being mounted to a major surface 22a so as to line up in a circumferential direction. Similarly, the negative-side heat sink 23 is formed into a flat arc shape having a larger diameter than that of the positive-side heat sink 22, a plurality of the diode elements 21 being mounted to a major surface 23a so as to line up in a circumferential direction. The positive-side and negative-side heat sinks 22 and 23 are disposed concentrically with the major surfaces 22a and 23a positioned in a common plane, the circuit board 24 being disposed on the major surfaces 22a and 23a of the positive-side and negative-side heat sinks 22 and 23. Here, the flange portions 26 at the first and second ends are positioned above first and second circumferential end portions of the major surface 23a of the negative-side heat sink 23. Although not shown, a central flange portion is positioned at a circumferentially-central portion of the major surface 23a of the negative-side heat sink 23. The flange portion 26 at the first end is constructed so as to project circumferentially beyond an end portion of the negative-side heat sink 23.

Mounting screws 27 pass from inside the rear bracket 2 through the circuit board 24, the flange portions 26, and the negative-side heat sink 23 and are fastened to the rear bracket 2. Thus, the rectifier apparatus 20 is securely fastened to mounting surfaces 2a of the rear bracket 2 with the mounting screws 27 at three positions including first and second ends and a central portion in a circumferential direction. The positive-side heat sink 22 is electrically insulated from the negative-side heat sink 23 and the mounting screws 27 by electrically-insulating bushes 28 and 29. The negative-side heat sink 23 is electrically connected to the rear bracket 2 through the mounting surfaces 2a of the rear bracket 2.

Next, an automotive alternator output terminal portion construction will be explained with reference to FIG. 4.

A relay terminal bolt 30 functioning as a mounting member is made of an electrically-conductive material such as iron, etc., knurling being applied to a root portion of a head portion 30a to form a knurled portion 30b. The relay terminal bolt 30 is mounted to the flange portion 26 at the first end of the positive-side heat sink 22 by press-fitting the knurled portion 30b into a penetrating aperture 26a disposed through the flange portion 26. An output terminal 31 is made of an electrically-conductive material such as iron, etc., and has: a coupling seat 32; an external screw thread portion 33 for mounting a wiring harness terminal, disposed so as to extend from a first side of the coupling seat 32; and a mounting portion 34 disposed so as to extend from a second side of the coupling seat 32, a penetrating aperture 34a being disposed through a tip of the mounting portion 34. A terminal mould 35 functioning as an electrically-insulating bush is molded integrally with the output terminal 31 using a phenolic resin, for example.

The output terminal 31 is mounted by passing an output terminal mounting external screw thread portion 30c of the relay terminal bolt 30 through the penetrating aperture 34a, and securely fastened to the flange portion 26 (the positive-side heat sink 22) by means of an output terminal mounting nut 36 screwed onto the external screw thread portion 30c. Here, the fastening force of the output terminal mounting nut 36 is received by a knurled joint portion constructed by press-fitting the knurled portion 30b into the penetrating aperture 26a and by contact between the head portion 30a and the flange portion 26. The terminal mold 35 is mounted to the rear bracket 2 in a loosely-fitted state. Here, a hook portion 35a is formed on the terminal mold 35 such that the terminal mold 35 can move slightly in a radial direction relative to the rear bracket 2.

A wiring harness terminal 37 is securely fastened to the coupling seat 32 by means of a wiring harness terminal mounting nut 38 screwed onto the external screw thread portion 33.

In an automotive alternator constructed in this manner, an electric current is supplied to the field winding 12 from a battery (not shown) by means of the brushes 10 and the slip rings 9, generating a magnetic flux. Claw-shaped magnetic poles in the first pole core 13 are magnetized into North-seeking (N) poles by this magnetic flux, and claw-shaped magnetic poles in the second pole core 14 are magnetized into South-seeking (S) poles. At the same time, rotational torque from an engine is transmitted to the shaft 6 by means of a belt (not shown) and the pulley 4, rotating the rotor 7. Thus, a rotating magnetic field is imparted to the stator winding 15, generating an electromotive force in the stator winding 15. This alternating-current electromotive force passes through the rectifier apparatus 20 and is converted into a direct current and the magnitude thereof is adjusted by the regulator 18. Output from the rectifier apparatus 20 passes through the relay terminal bolt 30, the output terminal 31, and the wiring harness terminal 37 to charge the battery.

According to Embodiment 1, the wiring harness terminal 37 is electrically connected in a state of surface contact with the coupling seat 32, and the mounting portion 34 is electrically connected in a state of surface contact with the flange portion 26 (the positive-side heat sink 22). Thus, because fastening portions involving the screw and the knurled joint portion are removed from the main electrical conduction pathway leading from the wiring harness terminal 37 to the positive-side heat sink 22, increases in electrical resistance are suppressed, enabling loss of output power to be reduced. In addition, heat generation in the electrical conduction pathway leading from the wiring harness terminal 37 to the positive-side heat sink 22 is suppressed, suppressing temperature increases in the diode elements 21 resulting from heat generated that electrical conduction pathway.

Because the fastening force of the wiring harness terminal mounting nut 38 for securing the wiring harness terminal 37 to the output terminal 31 is received by the coupling seat 31 directly, even if heat generation were hypothetically to arise in the coupling portion between the wiring harness terminal mounting nut 38 and the external screw thread portion 33 and heat degradation and thermal contraction of the terminal mold 35 did occur, the fastening force of the wiring harness terminal mounting nut 38 is ensured. Thus, the occurrence of insufficient force for fastening the wiring harness terminal 37 to the output terminal 31 is prevented.

Because the fastening force of the output terminal mounting nut 36 for securing the output terminal 31 to the positive-side heat sink 22 is received by a contact surface between the head portion 30a of the relay terminal bolt 30 and the positive-side heat sink 22, even if heat generation were hypothetically to arise in the coupling portion between the knurled portion 30b and the penetrating aperture 26a, the fastening force of the output terminal mounting nut 36 is ensured. Thus, the occurrence of reductions in the force fastening the output terminal 31 to the positive-side heat sink 22 is prevented.

The flange portion 26 of the positive-side heat sink 22 is secured to the rear bracket 2 by fastening with a mounting screw 27 in the vicinity of the mounting position of the relay terminal bolt 30. Thus, because the relay terminal bolt 30 and the mounting screw 27 are in close proximity, resistance of the flange portion 26 to vibration is increased, suppressing the occurrence of damage to the flange portion 26 resulting from vibration transmitted through the wiring harness terminal 37 and the output terminal 31 to the relay terminal bolt 30.

Because the relay terminal bolt 30 is mounted to a projecting portion of the flange portion 26, the relay terminal bolt 30 is positioned circumferentially outside a mounting screw 27 of the positive-side heat sink 22. Thus, the relay terminal bolt 30 is disposed on an opposite side of the mounting screw 27 from the diode elements 21 and the distance between the relay terminal bolt 30 and the diode elements 21 is increased, suppressing temperature increases in the diode elements 21 resulting from heat generation in the relay terminal bolt 30 or the output terminal 31.

Because the terminal mold 35 is formed integrally with the output terminal 31 by molding, the number of parts is reduced, improving assembly.

Because the terminal mold 35 is mounted to the rear bracket 2 in a loosely-fitted state, the terminal mold 35 is able to move slightly relative to the rear bracket 2 in an axial direction and a radial direction of the output terminal 31, ensuring relief of the output terminal 31 during fastening with the output terminal mounting nut 36, thereby enabling surface pressure of the portion of the positive-side heat sink 22 and the mounting portion 34 of the output terminal 31 coming into surface contact with each other to be increased.

Because the relay terminal bolt 30 projects outward from the positive-side heat sink 22 in the axial direction of the housing 3, and the output terminal 31 is led out through the rear bracket 2 so as to project outward from the relay terminal bolt 30 in the radial direction of the housing 3, increased axial length of the automotive alternator can be suppressed.

Figure 5:
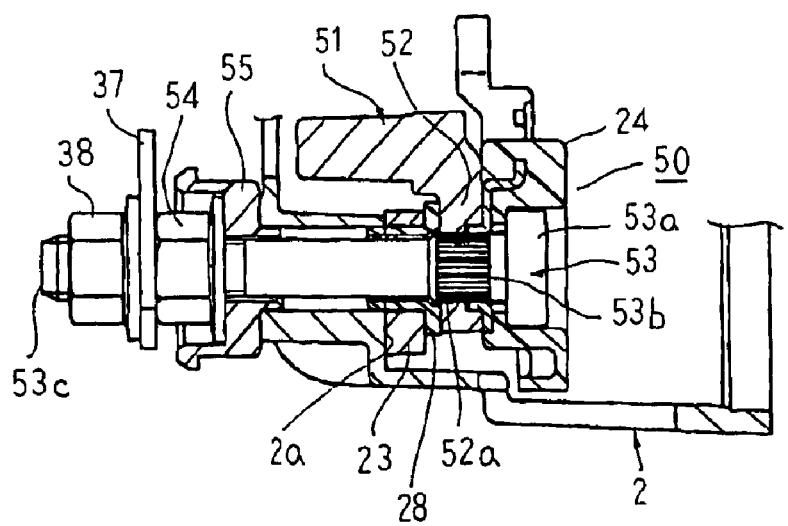
FIG. 5 is a partial cross section showing a wiring harness terminal mounted to an output terminal of a automotive alternator functioning as a comparative example.

Now, an automotive alternator functioning as a comparative example adopting the output terminal construction shown in FIG. 5 was prepared and the effects according to Embodiment 1 were verified.

Figure 6:
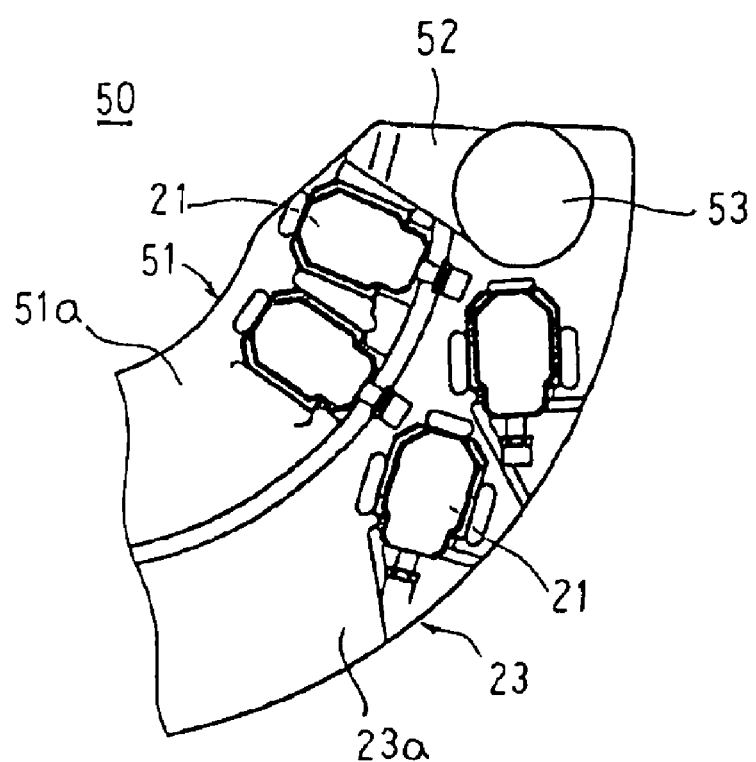
FIG. 6 is a plan showing part of a rectifier apparatus used in the automotive alternator functioning as a comparative example with a circuit board removed.

In the automotive alternator functioning as a comparative example, a rectifier apparatus 50 shown in FIG. 6 is used.

More specifically, a positive-side heat sink 51 is used instead of the positive-side heat sink 22. This positive-side heat sink 51 is formed into a flat arc shape having flange portions 52 at first and second ends and a central portion in a circumferential direction, a plurality of diode elements 21 being mounted to a major surface 51a so as to line up in a circumferential direction. The positive-side and negative-side heat sinks 51 and 23 are disposed concentrically with the major surfaces 51a and 23a positioned in a common plane, the circuit board 24 being disposed on the major surfaces 51a and 23a of the positive-side and negative-side heat sinks 51 and 23. Here, the flange portions 52 at the first and second ends are positioned above first and second circumferential end portions of a major surface 23a of the negative-side heat sink 23. Although not shown, a central flange portion is positioned at a circumferentially-central portion of the major surface 23a of the negative-side heat sink 23.

As shown in FIG. 5, an output terminal 53 is mounted to the flange portion 52 at the first circumferential end of the positive-side heat sink 51 by press-fitting a knurled portion 53b into a penetrating aperture 52a disposed through the flange portion 52. This output terminal 53 is led out through the rear bracket 2 in an axial direction, a first nut 54 being fastened to an external screw thread portion 53c thereof. The fastening force of this first nut 54 is received by a contact surface between a head portion 53a of the output terminal 53 and the circuit board 24, compressing an electrically-insulating bush 55. Although not shown, mounting screws 27 pass from inside the rear bracket 2 through the circuit board 24, the flange portions 52, and the negative-side heat sink 23 at central and second-end positions in a circumferential direction and are fastened to the rear bracket 2. Thus, the rectifier apparatus 50 is mounted to the rear bracket 2 with the negative-side heat sink 23 in close contact with the mounting surfaces 2a of the rear bracket 2. A wiring harness terminal 37 is securely fastened to the first nut 54 with a wiring harness terminal mounting nut 38 screwed onto the external screw thread portion 53c.

Automotive alternators according Embodiment 1 and the comparative example were operated so as to attain an output of 14 V at 180 A (2.5 kW), and the temperatures of the output terminal 31 and 53 and the diode elements 21 were measured. Moreover, the ambient temperature was 100 degrees Celsius (100° C.).

In the automotive alternator according to the comparative example, the temperature of the output terminal 53 was 200 degrees Celsius (200° C.), and the temperature of the diode elements was 180 degrees Celsius (180° C.). However, in the automotive alternator according to Embodiment 1, the temperature of the output terminal 31 was 140 degrees Celsius (140° C.), and the temperature of the diode elements 21 was 160 degrees Celsius (160° C.), confirming that temperature reductions are achieved in the output terminal 31 and the diode elements 21.

More specifically, in this comparative example, in the electrical conduction pathway from the wiring harness terminal 37 to the positive-side heat sink 51, there is a coupling portion between the external screw thread portion 53c and the first nut 54 and a knurled coupling portion between the knurled portion 53b and the penetrating aperture 52a. These connection portions are generally in a state of line contact, having reduced contact surface area, thereby increasing electrical resistance. Thus, it can be inferred that heat generation at these connection portions is large, giving rise to temperature increases in the output terminal 53. In addition, because the output terminal 51 is mounted to the flange portion 52 above the first circumferential end portion of the negative-side heat sink 23, it can also be inferred that the output terminal 53 is disposed in close proximity to the diode elements 21, heat generation in the output terminal 53 giving rise to temperature increases in the diode elements 21.

Thus, when double-rectifying to reduce ripples, because the number of diode elements mounted to the heat sink doubles and the distance between the diode elements and the output terminal (the relay terminal bolt) is reduced, it is particularly effective to adopt the output terminal construction of the present invention to suppress temperature increases in the diode elements.

In this comparative example, because the first nut 54 is fastened so as to compress the electrically-insulating bush 55 made of a resin, heat generation at the coupling portion between the first nut 54 and the external screw thread portion 53c gives rise to heat degradation and thermal contraction of the electrically-insulating bush 55. In addition, the fastening force of the first nut 54 is received by the contact surface between the head portion 53a of the output terminal 53 and the circuit board 24 made of a resin. Thus, heat generation at the knurled coupling portion between the knurled portion 53b of the output terminal 53 and the penetrating aperture 52a gives rise to heat degradation and thermal contraction of the circuit board 24. As a result, loosening of the first nut 54 occurs, giving rise to reductions in the force fastening the wiring harness terminal 37 to the output terminal 53.

On the other hand, according to Embodiment 1, because the fastening force of the wiring harness terminal mounting nut 38 for securing the wiring harness terminal 37 to the output terminal 31 is received by the coupling seat 31 directly and the fastening force of the output terminal mounting nut 36 for securing the output terminal 31 to the positive-side heat sink 22 is received by a contact surface between the head portion 30a of the relay terminal bolt 30 and the positive-side heat sink 22, the problems of the comparative example described above are solved.

Embodiment 2

Figure 7:
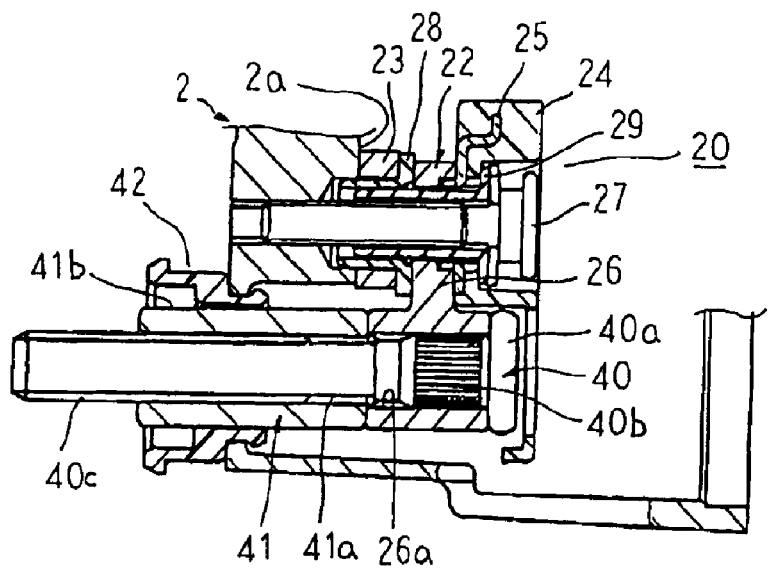
FIG. 7 is a partial cross section showing a vicinity of an output terminal portion in an automotive alternator according to Embodiment 2 of the present invention.
Figure 8:
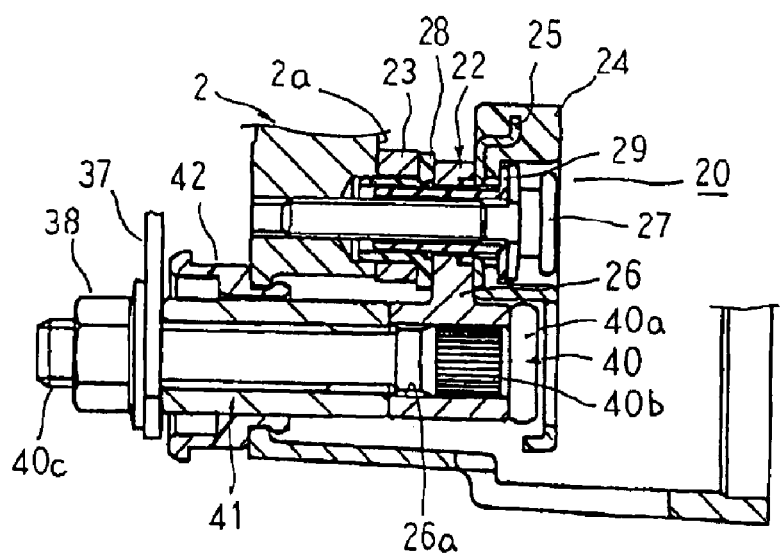
FIG. 8 is a partial cross section showing a wiring harness terminal mounted to an output terminal of the automotive alternator according to Embodiment 2 of the present invention.

FIG. 7 is a partial cross section showing a vicinity of an output terminal portion in an automotive alternator according to Embodiment 2 of the present invention, and FIG. 8 is a partial cross section showing a wiring harness terminal mounted to an output terminal of the automotive alternator according to Embodiment 2 of the present invention.

In FIGS. 7 and 8, an output terminal 40 is made of an electrically-conductive material such as iron, etc., knurling being applied to a root portion of a head portion 40a to form a knurled portion 40b. A bushing nut 41 functioning as a relay member is made of an electrically-conductive material such as iron, etc., in a cylindrical shape, an internal thread portion 41a for screwing together with an external screw thread portion 40c on the output terminal 40 being formed on an inner circumference at a first end of the bushing nut 41, and a nut portion 41b being formed on an outer periphery at a second end. The output terminal 40 is mounted to a flange portion 26 formed at a first circumferential end of the positive-side heat sink 22 by press-fitting the knurled portion 40b into a penetrating aperture 26a disposed through the flange portion 26. In addition, the bushing nut 41 is secured by screwing the internal thread portion 41a onto the external screw thread portion 40c of the output terminal 40 and fastening the bushing nut 41 using the nut portion 41b. Thus, the bushing nut 41 and the head portion 40a of the output terminal 40 are placed in contact with first and second surfaces of the flange portion 26 of the positive-side heat sink 22 in a state of surface contact. Thus, the output terminal 40 is fixed to the positive-side heat sink 22 firmly by the fastening force of the bushing nut 41 as well as the strength of the knurled coupling.

The rectifier apparatus 20 mounted with the output terminal 40, in a similar manner to Embodiment 1 above, is securely fastened to the mounting surfaces 2a of the rear bracket 2 by mounting screws 27 at three positions including first and second ends and a central portion in a circumferential direction. An output extraction end of the output terminal 40 projects outward from the rear bracket 2 in an axial direction. In addition, an electrically-insulating bush 42 is mounted to the rear bracket 2, ensuring electrical insulation between the output terminal 40 and the rear bracket 2.

In addition, a wiring harness terminal 37 is securely fastened to the bushing nut 41 with a wiring harness terminal mounting nut 38 screwed onto the external screw thread portion 40c.

In Embodiment 2, because the wiring harness terminal 37 is electrically connected in a state of surface contact with the bushing nut 41, and the bushing nut 41 is electrically connected in a state of surface contact with the flange portion 26 (the positive-side heat sink 22), increases in electrical resistance at the output terminal portion are suppressed, also enabling similar effects to those in Embodiment 1 above to be achieved.

Because the bushing nut 41 is interposed between the wiring harness terminal 37 and the flange portion 26 of the positive-side heat sink 22, a region of the output terminal 40 corresponding to the axial length of the bushing nut 41 elongates to generate a fastening force when fastening the wiring harness terminal mounting nut 38 to the external screw thread portion 40c. Thus, the fastening load of the wiring harness terminal mounting nut 38 is distributed and supported by the output terminal 40 being extended, reducing the occurrence of damage such as buckling of the output terminal 40, etc.

Because the fastening force of the wiring harness terminal mounting nut 38 for securing the wiring harness terminal 37 to the output terminal 40 is received by the bushing nut 41 directly, even if heat generation were hypothetically to arise in the coupling portion between the wiring harness terminal mounting nut 38 and the external screw thread portion 40c and heat degradation and thermal contraction of the electrically-insulating bush 42 did occur, the fastening force of the wiring harness terminal mounting nut 38 is ensured. Thus, the occurrence of insufficient force for fastening the wiring harness terminal 37 to the output terminal 40 is prevented.

Because the fastening force of the wiring harness terminal mounting nut 38 is received by a contact surface between the head portion 40a of the output terminal 40 and the positive-side heat sink 22, even if heat generation were hypothetically to arise in the coupling portion between the knurled portion 40b and the penetrating aperture 26a, the fastening force of the wiring harness terminal mounting nut 38 is ensured. Thus, the occurrence of reductions in the force fastening the output terminal 40 to the positive-side heat sink 22 is prevented.

Moreover, in Embodiment 2 above, the bushing nut 41 is fastened to the external screw thread portion 40b of the output terminal 40, but a metal bushing formed into a cylindrical shape may also be used instead of the bushing nut 41. In that case, the wiring harness terminal 37 and the bushing are securely fastened to the flange portion 26 of the positive-side heat sink 22 by mounting the bushing to the output terminal 40 in a loosely-fitted state and fastening a wiring harness terminal mounting nut 38 to a portion of the output terminal 40 projecting through the bushing. Thus, a state of surface contact between the wiring harness terminal 37 and the bushing is ensured, and a state of surface contact between the bushing and the flange portion 26 is also ensured.

In each of the above embodiments, an automotive alternator has been explained, but the present invention is not limited to an automotive alternator and may also be applied to a rotary electric machine such as an alternating-current motor, an alternating-current electric motor-generator, etc. In addition, the present invention is not limited to rotary electric machineries for automotive use and, for example, can also be applied to rotary electric machineries for marine vessels.

What is claimed is:

1. A rotary electric machine comprising:

a rectifier apparatus having positive-side and negative-side heat sinks each mounted with a plurality of diode elements and a circuit board made of a resin in which insert conductors for connecting said diode elements are insert molded, said rectifier apparatus being mounted to a housing by electrically-connecting said negative-side heat sink to said housing and securely fastening said positive-side and negative-side heat sinks and said circuit board to a mounting surface of said housing;

an output terminal for extracting output from said rectifier apparatus; and a wiring harness terminal mounted to said output terminal, wherein said rotary electric machine is provided with a mounting member having a head portion disposed at an opposite end from an output extraction end and an output terminal mounting external screw thread portion disposed at said output extraction end, said mounting member being mounted to said positive-side heat sink such that said head portion is in a state of close surface contact with a first surface of said positive-side heat sink, said mounting member passes through said positive-side heat sink, and said output terminal mounting external screw thread portion projects outward from a second surface of said positive-side heat sink, said output terminal has a coupling seat, a wiring harness terminal mounting external screw thread portion disposed at an output extraction end of said coupling seat and a mounting portion disposed on at an opposite end from said output extraction end of said coupling seat, said output terminal being mounted to said positive-side heat sink by securely fastening said mounting portion to said second surface of said positive-side heat sink in a state of surface contact by means of an output terminal mounting nut screwed onto said output terminal mounting external screw thread portion such that said coupling seat and said wiring harness terminal mounting external screw thread portion project outward from said housing, and said wiring harness terminal is securely fastened to said coupling seat in a state of surface contact by means of a wiring harness terminal mounting nut screwed onto said wiring harness terminal mounting external screw thread portion.

2. The rotary electric machine according to claim 1, wherein said output terminal projects outward from said housing in a radial direction.

3. The rotary electric machine according to claim 1, wherein an electrically-insulating bush made of a resin is integrally molded with said output terminal to ensure electrically-insulating properties between said output terminal and said housing.

4. The rotary electric machine according to claim 3, wherein said electrically-insulating bush is mounted to said housing in a loosely-fitted state.

5. The rotary electric machine according to claim 1, wherein a position at which said mounting member is mounted to said positive-side heat sink is in close proximity to a position at which said rectifier apparatus is securely fastened to said housing.

6. The rotary electric machine according to claim 5, wherein said position at which said mounting member is mounted to said positive-side heat sink is on an opposite side of said position at which said rectifier apparatus is securely fastened to said housing from said diodes.

* * * * *